US012655317B2

(12) United States Patent
Khizar

(10) Patent No.: US 12,655,317 B2
(45) **Date of Patent: \*Jun. 16, 2026**

(54) COATING FOR A SUBSTRATE

(71) Applicant: WHIRLPOOL CORPORATION, Benton Harbor, MI (US)

(72) Inventor: Muhammad Khizar, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 1001 days.

This patent is subject to a terminal disclaimer.

(21) Appl. No.: 17/748,410

(22) Filed: May 19, 2022

(65) Prior Publication Data

US 2022/0396714 A1     Dec. 15, 2022

Related U.S. Application Data

(60) Provisional application No. 63/208,765, filed on Jun. 9, 2021.

(51) Int. Cl.
| | |
|---|---|
| *C09D 183/04* | (2006.01) |
| *C04B 35/26* | (2006.01) |
| *C09D 5/23* | (2006.01) |
| *C09D 5/24* | (2006.01) |
| *C09D 7/40* | (2018.01) |

(Continued)

(52) U.S. Cl.
CPC ............. *C09D 183/04* (2013.01); *C09D 5/24* (2013.01); *C09D 7/61* (2018.01); *C09D 7/70* (2018.01); *C09D 7/80* (2018.01)

(58) Field of Classification Search
CPC ... H01F 1/34; H01F 1/344; H01F 1/36; H01F 1/37; C09D 183/04; C09D 5/23; C09D 7/61; C09D 7/70; C09D 7/80; C04B 35/2608; C04B 35/2658; H05B 3/12;

(Continued)

(56) References Cited

U.S. PATENT DOCUMENTS

| | | | |
|---|---|---|---|
| 4,363,917 A | 12/1982 | Fischer et al. |
| 4,454,403 A | 6/1984 | Teich et al. |

(Continued)

FOREIGN PATENT DOCUMENTS

| | | |
|---|---|---|
| CN | 109348698 A | 2/2019 |
| CN | 111433517 A | 7/2020 |

(Continued)

OTHER PUBLICATIONS https://www.dow.com/en-us/product-technology/pt-elastomers-rubber/pg-elastomers-lsr.html.

*Primary Examiner* — Matthew E. Hoban
*Assistant Examiner* — Lynne Edmondson
(74) *Attorney, Agent, or Firm* — Price Heneveld LLP

(57) ABSTRACT

A coating for a substrate includes a first portion and a second portion. The first portion includes a first liquid silicone rubber, carbon nanotubes at a concentration of at least about 0.5% by weight of the first portion, and at least one ferrite-containing component chosen from carbon ferrite and nickel manganese ferrite. The second portion includes a second liquid silicone rubber, carbon nanotubes at a concentration of at least about 0.5% by weight of the second portion, and at least one ferrite-containing component chosen from carbon ferrite and nickel manganese ferrite. Methods of producing the coating are also disclosed.

18 Claims, 1 Drawing Sheet

(51) Int. Cl.
    *C09D 7/61*        (2018.01)
    *C09D 7/80*        (2018.01)
    *H01F 1/34*        (2006.01)

(58) Field of Classification Search
    CPC ......... H05B 3/141; C23C 26/00; C23C 28/00;
                           C23C 18/1262
    See application file for complete search history.

(56)                     References Cited

U.S. PATENT DOCUMENTS

| | | | |
|---|---|---|---|
| 4,542,271 | A | 9/1985 | Tanonis et al. |
| 5,107,087 | A | 4/1992 | Yamada et al. |
| 5,665,819 | A | 9/1997 | Tenzer |
| 7,473,874 | B2 | 1/2009 | Carlsson et al. |
| 12,101,866 | B2 * | 9/2024 | Guo .................... C09D 183/04 |
| 2006/0027555 | A1 | 2/2006 | Aisenbrey |
| 2006/0083948 | A1 * | 4/2006 | Kawaguchi .......... H05K 9/0083 |
| | | | 204/192.15 |
| 2012/0067871 | A1 | 3/2012 | Sherrer et al. |
| 2014/0268625 | A1 * | 9/2014 | Sherrer ................... H01L 23/66 |
| | | | 252/514 |
| 2018/0265417 | A1 | 9/2018 | Champion et al. |
| 2020/0163172 | A1 | 5/2020 | Khizar et al. |

FOREIGN PATENT DOCUMENTS

| | | | |
|---|---|---|---|
| CN | 111642939 | A | 11/2020 |
| EP | 4025015 | A1 | 7/2022 |
| JP | 2000302970 | A | 10/2000 |
| JP | 2013085915 | A | 5/2013 |
| WO | 0128771 | A1 | 4/2001 |
| WO | 2021094836 | A1 | 5/2021 |

* cited by examiner

COATING FOR A SUBSTRATE

CROSS-REFERENCE TO RELATED APPLICATION

This application claims priority to U.S. Provisional Patent Application No. 63/208,765, filed on Jun. 9, 2021, entitled "COATING FOR A SUBSTRATE," the disclosure to which is hereby incorporated herein by reference in its entirety.

FIELD OF THE DEVICE

The present device relates to a coating. More specifically, the present device relates to a coating for a substrate.

BRIEF SUMMARY OF THE DEVICE

According to a first aspect of the present disclosure, a coating for a substrate includes a first portion and a second portion. The first portion includes a first liquid silicone rubber, carbon nanotubes, and at least one ferrite-containing component chosen from carbon ferrite and nickel manganese ferrite. The carbon nanotubes in the first portion are at a concentration of at least about 0.5% by weight of the first portion. The second portion includes a second liquid silicone rubber, carbon nanotubes, and at least one ferrite-containing component chosen from carbon ferrite and nickel manganese ferrite. The carbon nanotubes in the second portion are at a concentration of at least about 0.5% by weight of the second portion.

According to a second aspect of the present disclosure, a coating for a substrate includes a first portion and a second portion. The first portion includes a first liquid silicone rubber, carbon nanotubes, carbon ferrite, and nickel manganese ferrite. The carbon nanotubes in the first portion are present at a concentration of at least about 0.5% by weight of the first portion. The second portion includes a second liquid silicone rubber, carbon nanotubes, carbon ferrite, and nickel manganese ferrite. The carbon nanotubes in the second portion are present at a concentration of at least about 0.5% by weight of the second portion.

According to a third aspect of the present disclosure, a method of forming a coating for a substrate includes mixing a first liquid silicone rubber, carbon nanotubes, carbon ferrite, and nickel manganese ferrite at a speed of at least about 1650 rpm for a duration of about one minute to form a first portion of the coating. The carbon nanotubes are present in the first portion at a concentration of at least about 0.5% by weight of the first portion. The method also includes mixing a second liquid silicone rubber, carbon nanotubes, carbon ferrite, and nickel manganese ferrite at a speed of at least about 1650 rpm for a duration of about one minute to form a second portion of the coating. The carbon nanotubes are present in the second portion at a concentration of at least about 0.5% by weight of the second portion. The method further includes mixing the first portion and the second portion together at a speed of less than about 1650 rpm for a duration of at least one minute to create an uncured coating. Additionally, the method includes applying the uncured coating to the substrate. Further, the method includes curing the uncured coating to form the coating on the substrate.

DETAILED DESCRIPTION

Figure 1:
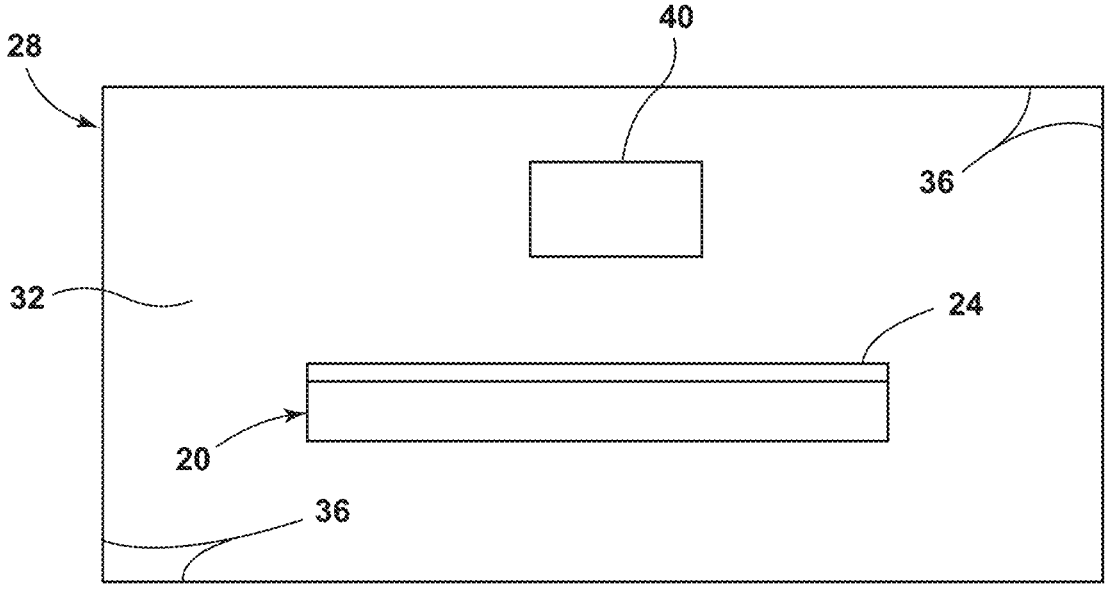
FIG. 1 is a schematic representation of an appliance equipped with a substrate that has a coating, according to one example.

The present illustrated embodiments reside primarily in combinations of method steps and apparatus components related to a cooking appliance door push button assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

With respect to FIG. 1, a substrate 20 is provided with a coating 24 on at least one surface thereof. In some examples, the coating 24 may be provided on an entirety of available external surfaces of the substrate 20. Alternatively, the coating 24 may be provided on less than an entirety of available external surfaces of the substrate 20. The coating 24 includes a first portion and a second portion. The first portion includes a first liquid silicone rubber, carbon nanotubes, and at least one ferrite-containing component chosen from carbon ferrite and nickel manganese ferrite. Said another way, the first portion can include carbon ferrite and/or nickel manganese ferrite. In various examples, the carbon nanotubes can be present at a concentration of at least about 0.3% by weight of the first portion. For example, the carbon nanotubes can be present at a concentration of about 0.3%, about 0.4%, about 0.5%, about 0.6%, about 0.7%, about 0.8%, about 0.9%, about 1.0%, about 1.1%, about 1.2%, about 1.3%, about 1.4%, about 1.5%, about 1.6%, about 1.7%, about 1.8%, about 1.9%, or about 2.0% by weight of the first portion. When carbon ferrite and nickel manganese ferrite are both present, a combined concentration of the carbon ferrite and the nickel manganese ferrite within the first portion can be in a range of about 60% to about 90% by weight of the first portion. For example, the carbon ferrite can be present at a concentration of about 20%, about 25%, about 30%, about 35%, or about 40% by weight of the first portion, while the nickel manganese ferrite is present at a concentration of about 40%, about 45%, about 50%, about 55%, about 60%, about 65%, or about 70% by weight of the first portion.

Referring again to FIG. 1, the second portion includes a second liquid silicone rubber, carbon nanotubes, and at least one ferrite-containing component chosen from carbon ferrite and nickel manganese ferrite. Said another way, the second portion can include carbon ferrite and/or nickel manganese ferrite. In some examples, the carbon nanotubes can be present at a concentration of at least about 0.3% by weight of the second portion. For example, the carbon nanotubes can be present at a concentration of about 0.3%, about 0.4%, about 0.5%, about 0.6%, about 0.7%, about 0.8%, about 0.9%, about 1.0%, about 1.1%, about 1.2%, about 1.3%, about 1.4%, about 1.5%, about 1.6%, about 1.7%, about 1.8%, about 1.9%, or about 2.0% by weight of the second portion. When carbon ferrite and nickel manganese ferrite are both present, a combined concentration of the carbon ferrite and the nickel manganese ferrite within the second portion can be in the range of about 60% to about 90% by weight of the second portion. For example, the carbon ferrite can be present at a concentration of about 20%, about 25%, about 30%, about 35%, or about 40% by weight of the second portion, while the nickel manganese ferrite is present at a concentration of about 40%, about 45%, about 50%, about 55%, about 60%, about 65%, or about 70% by weight of the second portion. In various examples, the carbon ferrite may be used as the sole ferrite component in the coating 24 or the nickel manganese ferrite may be used as the sole ferrite component in the coating 24. Accordingly, the carbon ferrite may be present at a concentration of about 60% to about 90% by weight of the coating 24. Similarly, in alternative examples, the nickel manganese ferrite may be present at a concentration of about 60% to about 90% by weight of the coating 24.

The substrate 20 and the coating 24 are designed for use within a heated environment of an appliance 28. For example, the appliance 28 may be, but is not limited to, a dishwasher, a microwave oven, an oven, an air fryer, or any other appliance 28 that provides a heated environment to a cavity 32 defined by walls 36 of the appliance 28. In various examples, the substrate 20 and/or the coating 24 may be utilized as a heat-producing component (e.g., hot plate, crisper plate, heating element, etc.) of the appliance 28. Accordingly, the composition of the coating 24 is formulated to withstand the heated environment within the cavity 32, as well as the heat provided by the substrate 20 and/or the coating 24. In some examples, the formulation of the coating 24 can be designed to generate heat. For example, components of the coating 24 (e.g., the carbon nanotubes, the carbon ferrite, and/or the nickel manganese ferrite) may be utilized in converting energy of a first type to energy of a second type.

In one example, the first type of energy may be electrical energy and the second type of energy may be thermal energy. In such an example, the electrical energy may be converted into the thermal energy as a result of thermo-resistive properties imparted to the coating 24 due to the chosen formulation. In another example, the first type of energy may be electro-magnetic energy (e.g., microwave energy) and the second type of energy may be thermal energy. In such an example, the electro-magnetic energy may interact with one or more components of the formulation of the coating 24 (e.g., the carbon ferrite and/or the nickel manganese ferrite) to convert the electro-magnetic energy into the thermal energy. It is contemplated that energy of a third type may be an intermediate step during the transition from the first type of energy to the second type of energy. For example, the third type of energy may be kinetic energy (e.g., vibration).

In examples where the formulation of the coating 24 is chosen to convert electro-magnetic energy into thermal energy, the coating 24 may exhibit a Curie temperature. The Curie temperature is the temperature at which a material begins to lose its magnetic properties. Once the Curie temperature is reached, absorption of the electro-magnetic energy (e.g., microwave energy) ceases and further heating can be prevented. Accordingly, the formulation of the coating 24 can be chosen or designed with a particular operating temperature or a maximum temperature in mind. In various examples, the Curie temperature of the coating 24 can be at least about 300° C. For example, the Curie temperature can be at least about 300° C., at least about 350° C., at least about 400° C., at least about 450° C., at least about 500° C., and/or combinations or ranges thereof. It is contemplated that the formulation of the coating 24 may be chosen such that a plurality of Curie temperatures exists for the coating 24. Regardless of the formulation of the coating 24, the substrate 20 may be made from a thermally conductive and/or an electrically conductive material (e.g., a metallic material).

In various examples, the appliance 28 may include a fan 40, a pump, or a similar device, that can be energized to circulate fluid (e.g., air or water) within the cavity 32 of appliance 28. By energizing, or turning on, the fan 40, fluid within the cavity 32 can be circulated to provide a more even distribution or diffusion of heat within the heated environment. The pump or similar device could be used in place of the fan 40 based on a particular example of the appliance 28. By providing a more even distribution or diffusion of heat within the heated environment, cooking, cleaning, and/or sanitizing operations that are performed by the appliance 28 can be carried out in a manner that is effective and/or efficient. For example, the more even distribution or diffusion of heat within the heated environment provided to the cavity 32 can result in more even and reproducible cooking, more effective or efficient cleaning of items within the cavity 32, and/or more effective or efficient sanitization of items within the cavity 32.

Figure 2:
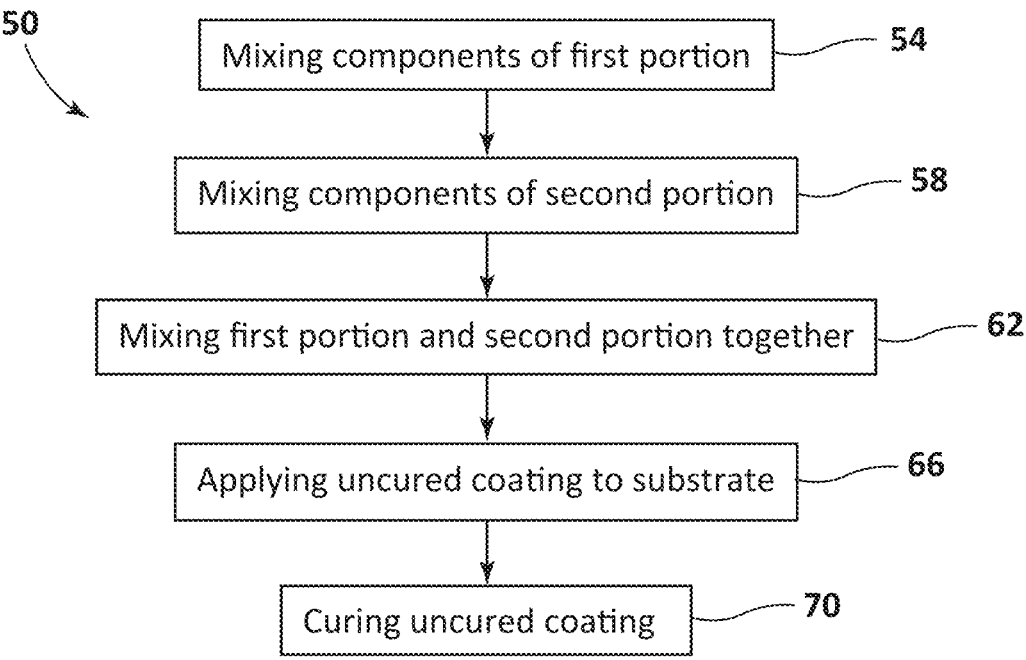
FIG. 2 is a flow diagram illustrating a method of forming the coating for the substrate, according to one example.

Referring now to FIG. 2, a method 50 of forming the coating 24 for the substrate 20 is depicted, according to one example. The method 50 includes step 54 of mixing components of the first portion of the coating 24. More specifically, the step 54 can include mixing the first liquid silicone rubber, carbon nanotubes, and at least one ferrite-containing component chosen from carbon ferrite and nickel manganese ferrite at a speed of at least about 1650 rpm for a duration of about one minute to form the first portion of the coating 24. For example, the speed of mixing may be about 1650 rpm, about 1700 rpm, about 1750 rpm, about 1800 rpm, about 1850 rpm, about 1900 rpm, about 1950 rpm, about 2000 rpm, and/or combinations or ranges thereof. In various examples, the carbon nanotubes may be present at a concentration of at least about 0.3% by weight of the first portion. For example, the carbon nanotubes can be present at a concentration of about 0.3%, about 0.4%, about 0.5%, about 0.6%, about 0.7%, about 0.8%, about 0.9%, about 1.0%, about 1.1%, about 1.2%, about 1.3%, about 1.4%, about 1.5%, about 1.6%, about 1.7%, about 1.8%, about 1.9%, or about 2.0% by weight of the first portion. In some examples, as discussed above, when carbon ferrite and nickel manganese ferrite are both present, the combined concentration of the carbon ferrite and the nickel manganese ferrite within the first portion can be in the range of about 60% to about 90% by weight of the first portion. For example, the carbon ferrite can be present at a concentration of about 20%, about 25%, about 30%, about 35%, or about 40% by weight of the first portion, while the nickel manganese ferrite is present at a concentration of about 40%, about 45%, about 50%, about 55%, about 60%, about 65%, or about 70% by weight of the first portion.

Referring again to FIG. 2, the method also includes step 58 of mixing the components of the second portion of the coating 24. More specifically, the step 58 can include mixing the second liquid silicone rubber, carbon nanotubes, and at least one ferrite-containing component chosen from carbon ferrite and nickel manganese ferrite at a speed of at least about 1650 rpm for a duration of about one minute to form the second portion of the coating 24. For example, the speed of mixing may be about 1650 rpm, about 1700 rpm, about 1750 rpm, about 1800 rpm, about 1850 rpm, about 1900 rpm, about 1950 rpm, about 2000 rpm, and/or combinations or ranges thereof. In some examples, the carbon nanotubes may be present at a concentration of at least about 0.3% by weight of the second portion. For example, the carbon nanotubes can be present at a concentration of about 0.3%, about 0.4%, about 0.5%, about 0.6%, about 0.7%, about 0.8%, about 0.9%, about 1.0%, about 1.1%, about 1.2%, about 1.3%, about 1.4%, about 1.5%, about 1.6%, about 1.7%, about 1.8%, about 1.9%, or about 2.0% by weight of the second portion.

Referring further to FIG. 2, in some examples, a three-dimensional (3D) bladeless centrifuge speed mixer can be employed in mixing the components of the first portion, mixing the components of the second portion, and/or mixing the first portion and the second portion together. In various examples, as discussed above, when carbon ferrite and nickel manganese ferrite are both present, the combined concentration of the carbon ferrite and the nickel manganese ferrite within the second portion can be in the range of about 60% to about 90% by weight of the second portion. For example, the carbon ferrite can be present at a concentration of about 20%, about 25%, about 30%, about 35%, or about 40% by weight of the second portion, while the nickel manganese ferrite is present at a concentration of about 40%, about 45%, about 50%, about 55%, about 60%, about 65%, or about 70% by weight of the second portion. In various examples, the carbon ferrite may be used as the sole ferrite component in the coating 24 or the nickel manganese ferrite may be used as the sole ferrite component in the coating 24. Accordingly, the carbon ferrite may be present at a concentration of about 60% to about 90% by weight of the coating 24. Similarly, in alternative examples, the nickel manganese ferrite may be present at a concentration of about 60% to about 90% by weight of the coating 24.

Referring still further to FIG. 2, the method 50 can further include step 62 of mixing the first portion and the second portion together at a speed of less than about 1650 rpm for a duration of at least about one minute to create an uncured coating. For example, the speed of mixing for step 62 may be about 1600 rpm, about 1550 rpm, about 1500 rpm, about 1450 rpm, about 1400 rpm, about 1350 rpm, about 1300 rpm, about 1250 rpm, about 1200 rpm, and/or combinations or ranges thereof. The method 50 can additionally include step 66 of applying the uncured coating to the substrate 20. In step 66, the uncured coating may be applied to at least one exterior surface of the substrate 20. In various examples, the method 50 of forming the coating 24 for the substrate 20 may conclude with step 70 of curing the uncured coating to form the coating 24 on the substrate 20. In some examples, the step 70 of curing the uncured coating to form the coating 24 on the substrate 20 can include placing the substrate 20 that has received the uncured coating into a less-than-atmospheric pressure environment. In such an example, the less-than-atmospheric pressure environment may be held at a temperature of about 70° C. Additionally, in such an example, the substrate 20 with the uncured coating applied thereto may remain in the heated less-than-atmospheric pressure environment for a duration of time that is between about 10 minutes and about 40 minutes. For example, the duration of time that the substrate 20 with the uncured coating applied thereto may remain in the heated less-than-atmospheric pressure environment may be about 10 minutes, about 15 minutes, about 20 minutes, about 25 minutes, about 30 minutes, about 35 minutes, about 40 minutes, and/or combinations or ranges thereof.

In various examples, the first and second liquid silicone rubbers can be readily mixed with one another and can be rapidly heat-cured into durable elastomers. In some examples, the first portion of the coating 24 may be used for mixing additives (e.g., active ingredients) while the second portion of the coating 24 may be used to adjust a viscosity of the formulation of the coating 24. In various examples, active ingredients to the formulation of the coating 24 can include the carbon nanotubes, the carbon ferrite, and/or the nickel manganese ferrite. In one specific example, the formulation of the coating 24 includes the first portion at a concentration of 80% and the second portion at a concentration of 20%. Said another way, in one specific example, the formulation of the coating 24 can be an 80:20 mixture of the first portion and the second portion, respectively. In one specific example of the formulation of the coating 24, the carbon ferrite was present at a concentration of 77.5% by weight of the coating 24, the carbon nanotube were present at a concentration of 2.5% by weight of the coating 24, and the first and second liquid silicone rubbers were present at a total concentration of 20% by weight of the coating 24. In another specific example of the formulation of the coating 24, the nickel manganese ferrite was present at a concentration of 80% by weight of the coating 24, the carbon nanotubes were present at a concentration of 1.5% by weight of the coating 24, and the first and second liquid silicone rubbers were present at a total concentration of 18.5% by weight of the coating 24.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

What is claimed is:

1. A coating for a substrate, comprising:
first portion components which are mixed together to form a first portion of said coating, wherein the first portion components include:
a first liquid silicone rubber;
carbon nanotubes at a concentration of at least about 0.5% by weight of the first portion; and
at least one ferrite-containing component chosen from carbon ferrite and nickel manganese ferrite; and
second portion components which are mixed together to form a second portion of said coating, wherein the second portion components include:
a second liquid silicone rubber;
carbon nanotubes at a concentration of at least about 0.5% by weight of the second portion; and
wherein the at least one ferrite-containing component within the first portion includes carbon ferrite, and wherein the at least one ferrite-containing component within the second portion is carbon ferrite, and wherein the carbon ferrite is present at a concentration of about 60% to about 90% by weight of said coating.

2. The coating for a substrate of claim 1, wherein the concentration of carbon nanotubes within the first portion is about 1.0% by weight of the first portion.

3. The coating for a substrate of claim 2, wherein the concentration of carbon nanotubes within the second portion is about 1.0% by weight of the second portion.

4. The coating for a substrate of claim 1, wherein the at least one ferrite-containing component also includes nickel manganese ferrite.

5. The coating for a substrate of claim 1, wherein the at least one ferrite-containing component within the second portion comprises carbon ferrite and nickel manganese ferrite.

6. The coating for a substrate of claim 5, wherein said coating exhibits a Curie temperature of at least about 300° C.

7. The coating for a substrate of claim 1, wherein said coating exhibits a Curie temperature of at least about 300° C.

8. The coating for a substrate of claim 1, wherein said coating covers an entirety of a surface area of said substrate.

9. A coating for a substrate, comprising:
first portion components which are mixed together to form a first portion of said coating, wherein the first portion components include:
a first liquid silicone rubber;
carbon nanotubes at a concentration of at least about 0.5% by weight of the first portion;
carbon ferrite; and
nickel manganese ferrite; and
second portion components which are mixed together to form a second portion of said coating, wherein the second portion components include:
a second liquid silicone rubber;
carbon nanotubes at a concentration of at least about 0.5% by weight of the second portion;
carbon ferrite; and
nickel manganese ferrite.

10. The coating for a substrate of claim 9, wherein the concentration of carbon nanotubes within the first portion is about 1.0% by weight of the first portion.

11. The coating for a substrate of claim 10, wherein the concentration of carbon nanotubes within the second portion is about 1.0% by weight of the second portion.

12. The coating for a substrate of claim 9, wherein a combined concentration of the carbon ferrite and the nickel manganese ferrite within the first portion is in a range of about 60% to about 90% by weight of the first portion.

13. The coating for a substrate of claim 12, wherein the carbon ferrite is present within the first portion at a concentration of about 20% to about 40% by weight of the first portion, and wherein the nickel manganese ferrite is present within the first portion at a concentration of about 40% to about 70% by weight of the first portion.

14. The coating for a substrate of claim 12, wherein a combined concentration of the carbon ferrite and the nickel manganese ferrite within the second portion is in a range of about 60% to about 90% by weight of the second portion.

15. The coating for a substrate of claim 13, wherein the carbon ferrite is present within the second portion at a concentration of about 20% to about 40% by weight of the second portion, and wherein the nickel manganese ferrite is present within the second portion at a concentration of about 40% to about 70% by weight of the second portion.

16. The coating for a substrate of claim 9, wherein said coating covers an entirety of a surface area of said substrate.

17. A method of forming a coating for a substrate, the method comprising:
mixing first portion components including a first liquid silicone rubber, carbon nanotubes, carbon ferrite, and nickel manganese ferrite at a speed of at least about 1650 rpm for a duration of about one minute to form a first portion of said coating, wherein the carbon nanotubes are present at a concentration of at least about 0.5% by weight of the first portion;

mixing second portion components including a second liquid silicone rubber, carbon nanotubes, carbon ferrite, and nickel manganese ferrite at a speed of at least about 1650 rpm for a duration of about one minute to form a second portion of said coating, wherein the carbon nanotubes are present at a concentration of at least about 0.5% by weight of the second portion;

mixing the first portion and the second portion together at a speed of less than about 1650 rpm for a duration of at least about one minute to create an uncured coating;

applying the uncured coating to said substrate; and curing the uncured coating to form said coating on said substrate.

18. The method of claim 17, wherein a combined concentration of the carbon ferrite and the nickel manganese ferrite within the first portion is in a range of about 60% to about 90% by weight of the first portion, and wherein a combined concentration of the carbon ferrite and the nickel manganese ferrite within the second portion is in a range of about 60% to about 90% by weight of the second portion.

* * * * *